United States Patent [19]
Berry, III

[11] Patent Number: 5,850,183
[45] Date of Patent: Dec. 15, 1998

[54] AIR FILTER RESTRICTION INDICATING DEVICE

[75] Inventor: Charles Henry Berry, III, Cedar Falls, Iowa

[73] Assignee: Engineered Products Co., Waterloo, Iowa

[21] Appl. No.: 393,878

[22] Filed: Feb. 24, 1995

[51] Int. Cl.[6] ................................................ G08B 21/00
[52] U.S. Cl. ........................ 340/607; 340/606; 340/611; 454/158; 454/146
[58] Field of Search ................................. 340/606–611; 454/146, 158; 55/274, DIG. 34

[56] References Cited

U.S. PATENT DOCUMENTS

| | | | |
|---|---|---|---|
| 3,068,831 | 12/1962 | Witchell | 116/267 |
| 3,117,550 | 1/1964 | Cole | 116/220 |
| 3,125,063 | 3/1964 | Hultgren | 116/268 |
| 3,639,998 | 2/1972 | Mason | 34/82 |
| 3,696,666 | 10/1972 | Johnson et al. | 340/607 |
| 3,793,885 | 2/1974 | Frick | 73/718 |
| 3,939,457 | 2/1976 | Nelson | 340/607 |
| 4,033,733 | 7/1977 | Nelson | 55/274 |
| 4,171,962 | 10/1979 | Kippel et al. | 55/274 |
| 4,369,728 | 1/1983 | Nelson | 116/276 |
| 4,423,751 | 1/1984 | Roettgen | 340/607 |
| 4,445,456 | 5/1984 | Nelson | 116/268 |
| 4,937,557 | 6/1990 | Tucci et al. | 340/607 |
| 5,351,035 | 9/1994 | Chrisco | 340/607 |
| 5,477,731 | 12/1995 | Mouton | 340/607 |

*Primary Examiner*—Thomas J. Mullen, Jr.
*Assistant Examiner*—Ashok Mannaua
*Attorney, Agent, or Firm*—McAndrews, Held & Malloy, Ltd.

[57] ABSTRACT

An air restriction indicating device for measuring very low ranges of filter restriction (e.g., on the order of 0.0 to 1.5 inches of $H_2O$ or 0.0 to 0.54 psi) in a micronfilter used in vehicular heating/ventilation/air conditioning (HVAC) systems. The indicating device includes a housing that is separated into two sub-chambers by a flexible diaphragm. A indicating member is carried by the diaphragm so that the diaphragm and the indicating member move, within the housing, responsively to changes in the pressure of the air flowing in the HVAC system caused by restrictions in or clogging of the micronfilter. To facilitate reading, the indicating device also includes structure that progressively locks the diaphragm and indicating member in position.

25 Claims, 11 Drawing Sheets

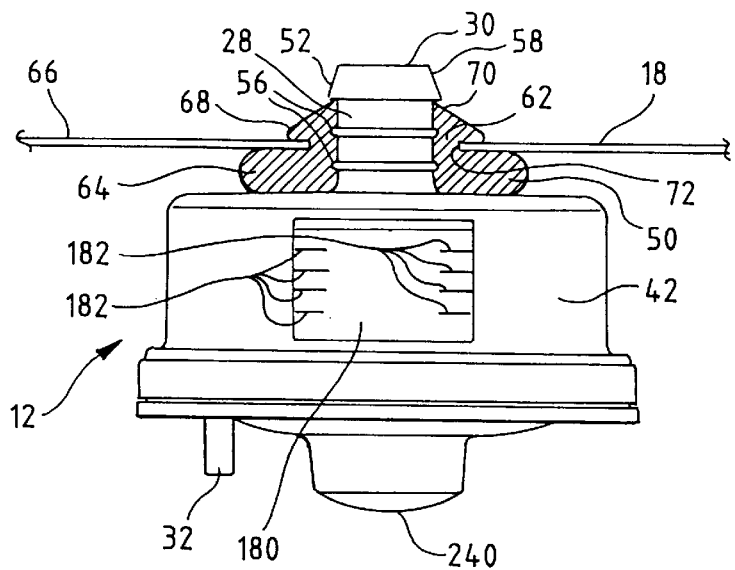
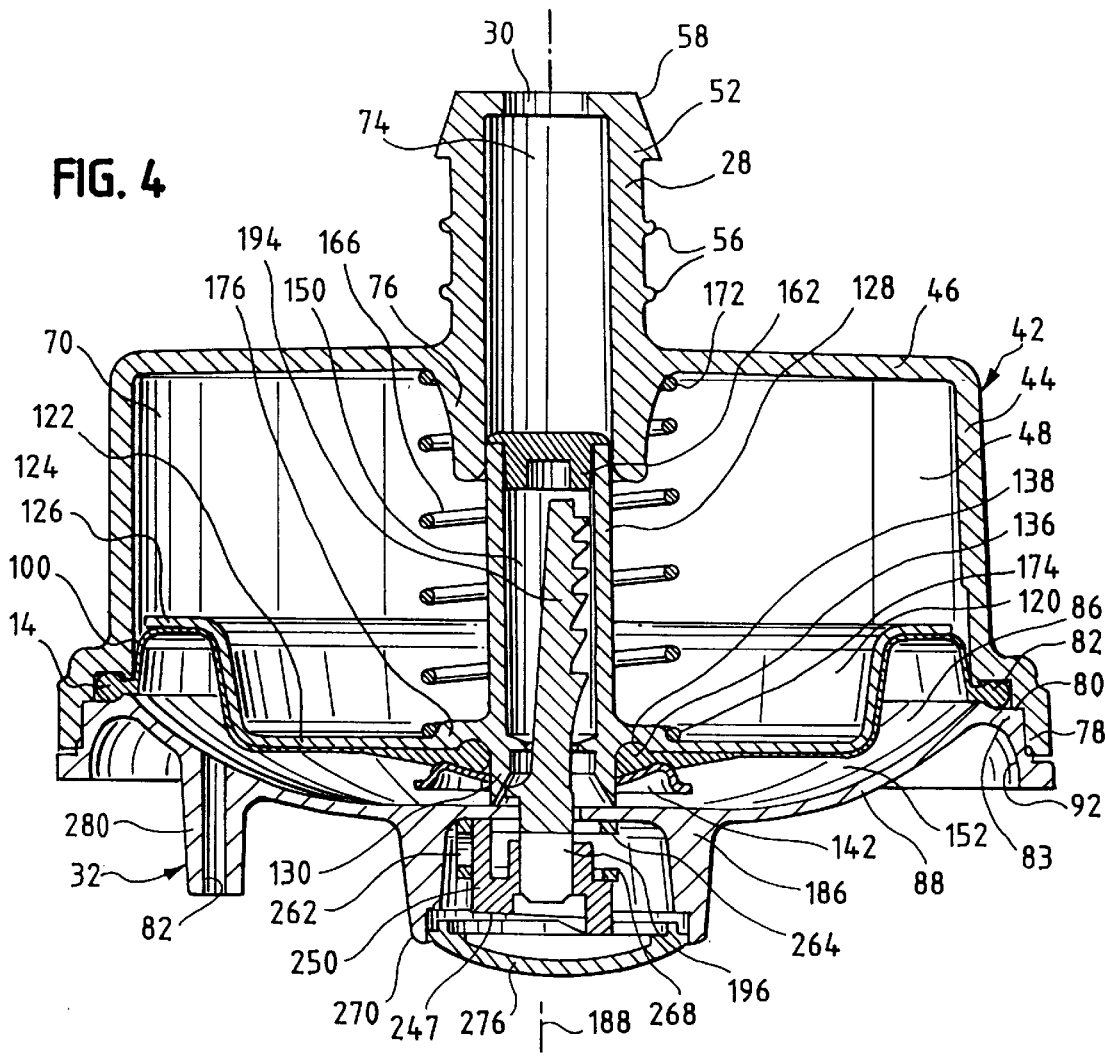

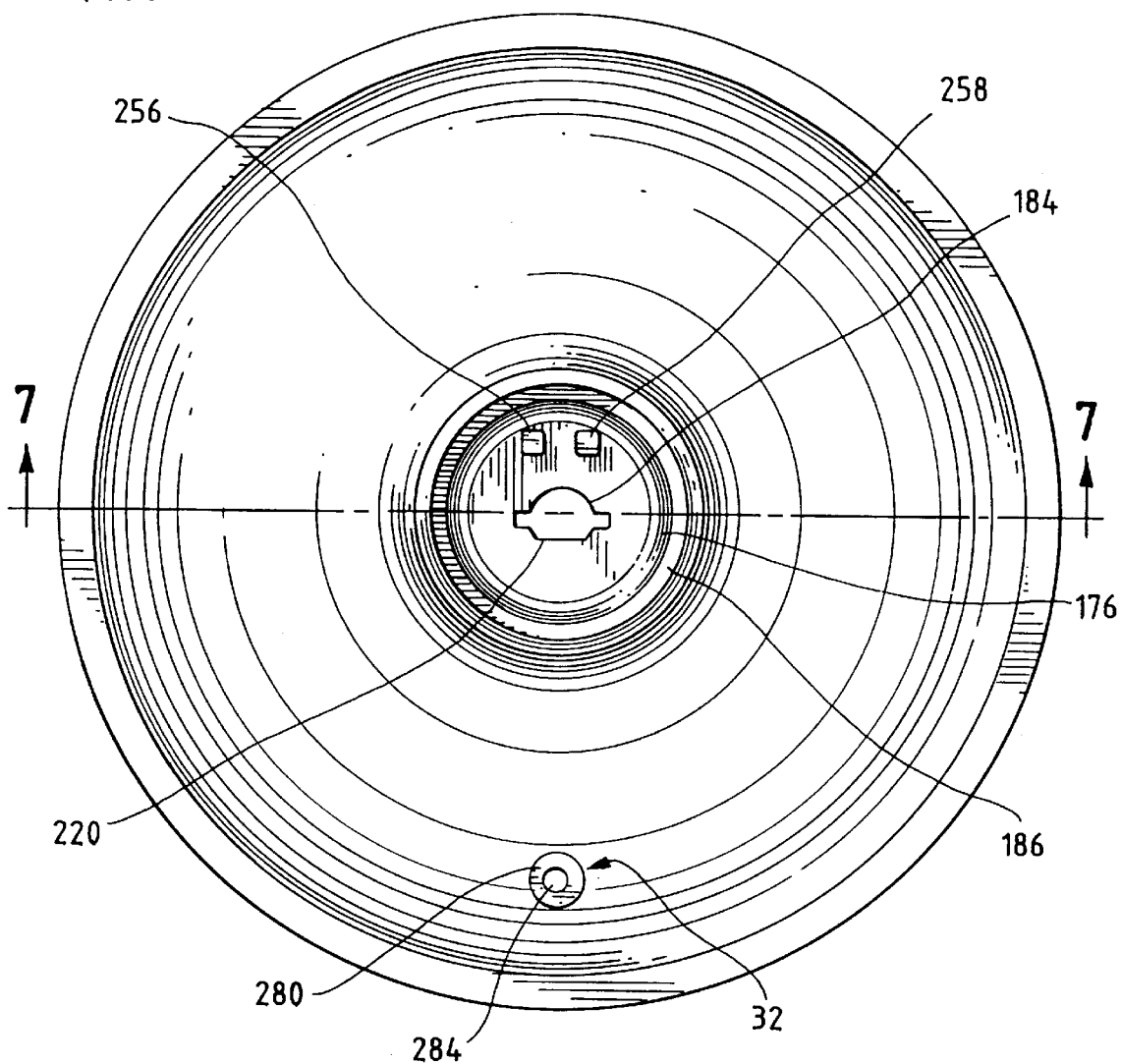
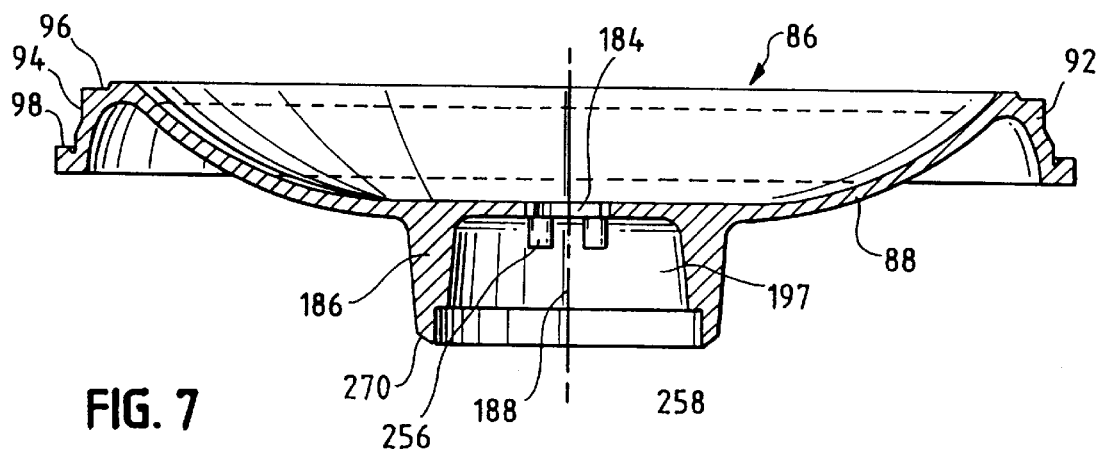

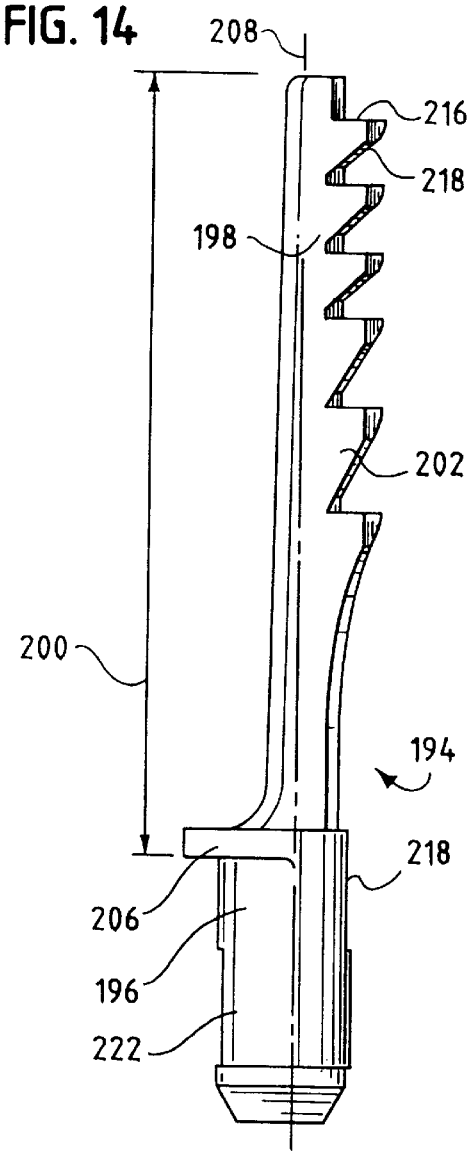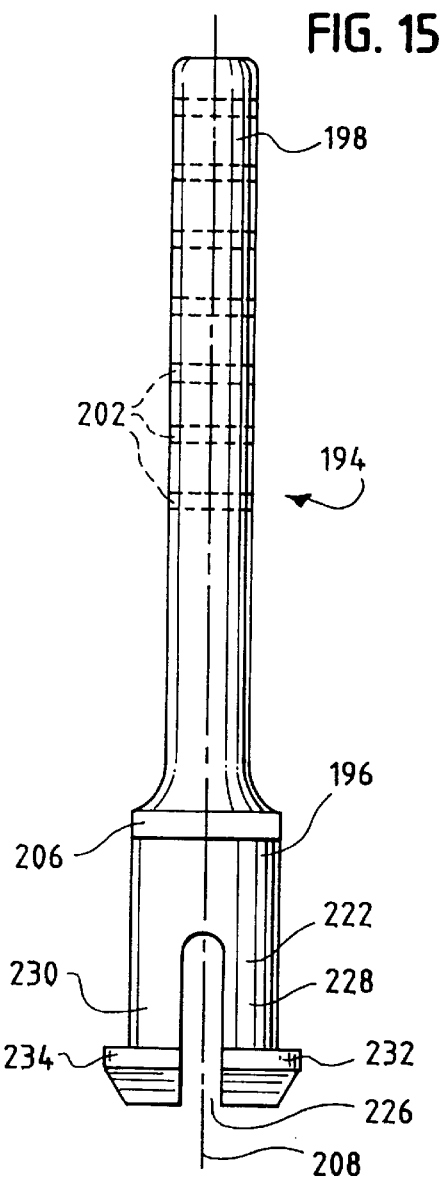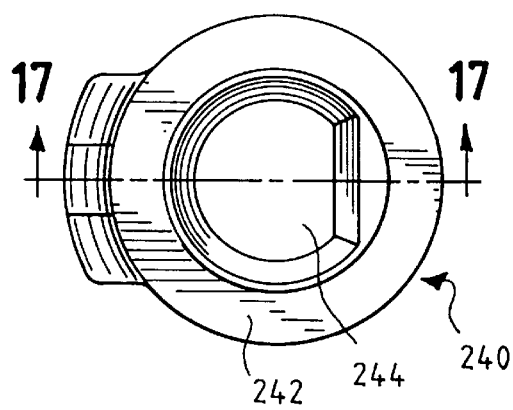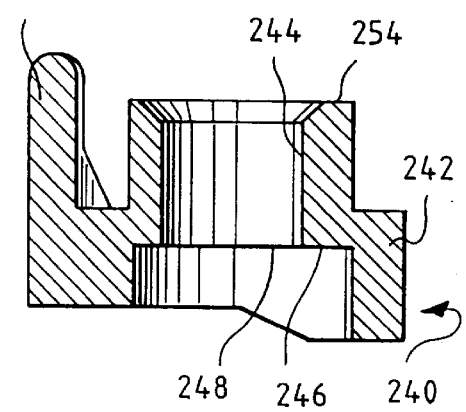

AIR FILTER RESTRICTION INDICATING DEVICE

FIELD OF THE INVENTION

The present invention relates to an improvement for an air filter restriction device adapted for use with a heating/ventilation/air conditioning (HVAC) system and, more particularly, to a device for detecting the level of clogging in a micronfilter of the type used in the HVAC system employed in vehicles such as automobiles.

BACKGROUND OF THE INVENTION

Air filters are employed in vehicle HVAC systems for automobiles to remove air pollution, pollen, and other particles and provide passengers with a more pleasant environment. These air filters are typically referred to as micronfilters because they are designed to filter out extremely small particles. Some claim that such filters are almost 100% effective in filtering out particulates as small as 3 microns. Thus, the filters are able to remove most problematic particulate, including pollen, mold spores and some forms of bacteria.

Over the years concern for air quality has increased, and so has consumer demand for such micron filtration HVAC systems. These systems are already prevalent in automobiles made in Europe, particularly in high end luxury automobiles. It is predicted that by the year 2000 all automobiles sold in the United States will employ HVAC systems.

As these micron filtration HVAC systems become more prevalent, a major concern has been the development of a low cost, reliable means for indicating when the air filter needs to be changed. Because the filter is located in the ducting that provides defrost air to the windshield, a partially plugged filter can cause impaired functioning of the defroster system. Premature filter replacement is also unsatisfactory because these filters are expensive, e.g. costing up to $40 per filter. Presently a low cost, reliable filter monitor for HVAC systems, i.e. that will reliably operate in the required low vacuum range of 0–1.5 inches $H_2O$(0–0.054 psi) is not available.

Low cost, reliable air filter restriction indicating devices are disclosed in U.S. Pat. Nos. 4,445,456; 4,369,728; 4,033,733; and 3,939,457, the disclosures of which are hereby incorporated by reference. However, the devices disclosed in these patents are used in connection with the intake air filtration systems of internal combustion engines, and they do not and cannot operate satisfactorily at the low vacuum, low pressure ranges of a typical automotive HVAC system.

Attempts have been made to employ electronic gages to monitor filter clogging. However, electronic gauges which will operate in the required low vacuum range are relatively expensive and are sensitive to vibration which is usually present in vehicles.

As a result, the practice has become to recommend changing the filters in the HVAC systems based on elapsed time, mileage, or visual inspection of the filter. These bases for changing filters are unsatisfactory especially for consumers, because premature filter replacement is not economically or environmentally sound.

SUMMARY OF THE INVENTION

It is therefore an object of the present invention to provide an accurate and reliable air filter restriction indicating device for use in an HVAC system and particularly a HVAC system in an automobile.

Another object of the present invention to provide an air filter restriction indicating device of the type described which is simple and economical to manufacture.

Yet another object of the present invention is to provide an air filter restriction indicating device of the type described which is accurate at low vacuum pressures such as those encountered in the micron filtration HVAC systems.

Still another object of the present invention is to provide an air filter restriction indicating device of the type described which may be used to monitor either vacuum pressure or differential pressure.

A further object of the present invention is to provide an air filter restriction device of the type described having a compact housing.

A still further object of the present invention is to provide an air filter restriction device of the type described having a generally linear response over its operating range. A related object of the present invention is to provide an air filter restriction device of the type described that can be adapted to produce an electrical output signal indicating the level of filter restriction.

These objects, benefits and advantages of the present invention are achieved by an improved air filter restriction indicating device that is capable of measuring very low ranges of filter restriction (e.g., on the order of 0.0 to 1.5 inches of $H_2O$ or 0.0 to 0.054 p.s.i.) in a micronfilter such as the micronfilters used in vehicular HVAC systems. The indicating device comprises a housing having a first end, a second end, and a side wall that includes a transparent portion. The housing defines a generally cylindrical, overall interior chamber. A flexible diaphragm is disposed within the interior chamber of the housing and has its edge portion secured to the side wall of the housing so that the diaphragm divides the overall chamber into first and second sub-chambers, with the first sub-chamber being adjacent to the first end of the housing and with the second sub-chamber being adjacent to the second end of the housing. The diaphragm is movable between a reset position where it is adjacent to the second end of the housing and an extended position where it is adjacent to the first end of the housing. An indicating member is disposed within the first sub-chamber and is mounted on and carried by the diaphragm. A spring biases the diaphragm to its reset position. The first sub-chamber is in communication with the air flowing in the HVAC system. The second sub-chamber may also be in communication with the air flowing HVAC system if the indicating device is to measure differential air pressure across the micronfilter. However, if the indicating device is to be used to measure the vacuum in the HVAC system, downstream from the micronfilter and upstream from the system's fan, the second sub-chamber is in communication with the atmosphere. Either way, as the micronfilter becomes restricted or clogged with dirt, particles, etc. entrained in the air flowing in the HVAC system, the pressure differential across the diaphragm changes, and the diaphragm—and the indicating member—move from the reset position to the extended position. During this movement between the reset and extended positions, a portion of the indicating member is visible through the transparent portion of the side wall and the position of the indicating member is indicative of the degree of restriction of the micronfilter. Alternatively, movement of the indicating member and diaphragm from the reset to the extended position may be sensed electrically so as to activate an electrical indicating circuit. The indicating device further includes means for progressively locking the indicating member into the various positions which the indicating member attains, within the first chamber as the diaphragm and the indicating member move from the reset position to the extended position. This lock-up means maintains the indicating member in its last such position even though the diaphragm may thereafter return to its reset position as, for example, when the HVAC system is turned off.

Still other objects, benefits and advantages of the present invention will become apparent upon reading the following detailed description and appended claims, with reference to the accompanying drawings.

BRIEF DESCRIPTION OF THE DRAWINGS

FIG. 3 is a side elevational view of the indicating device of the present invention shown mounted on an air duct.

FIG. 4 is a central, vertical cross-sectional view of the indicating device of FIG. 3, with the indicating device being shown in its reset position.

FIG. 6 is a bottom plan view of a base cap employed in the indicating device of the present invention.

FIG. 7 is a cross-sectional view the base cap taken along line 7—7 of FIG. 6.

FIG. 14 is a side elevational view of a locking member employed in the indicating device.

FIG. 15 is a bottom plan view of the locking member.

FIG. 16 is a top plan view of a reset button employed in the indicating device of the present invention.

FIG. 17 is a cross-sectional view taken along line 17—17 of FIG. 16.

DETAILED DESCRIPTION OF THE PREFERRED EMBODIMENTS

In the following detailed description, spatially orienting terms are used such as "left," "right," upper, lower, radial, "vertical," "horizontal," and the like. It is to be understood that these terms are used for convenience of description of the preferred embodiments by reference to the drawings. These terms do not necessarily describe the absolute location in space, such as left, right, upward, downward, etc., that any part may assume in the actual practice of the invention.

Figure 1:
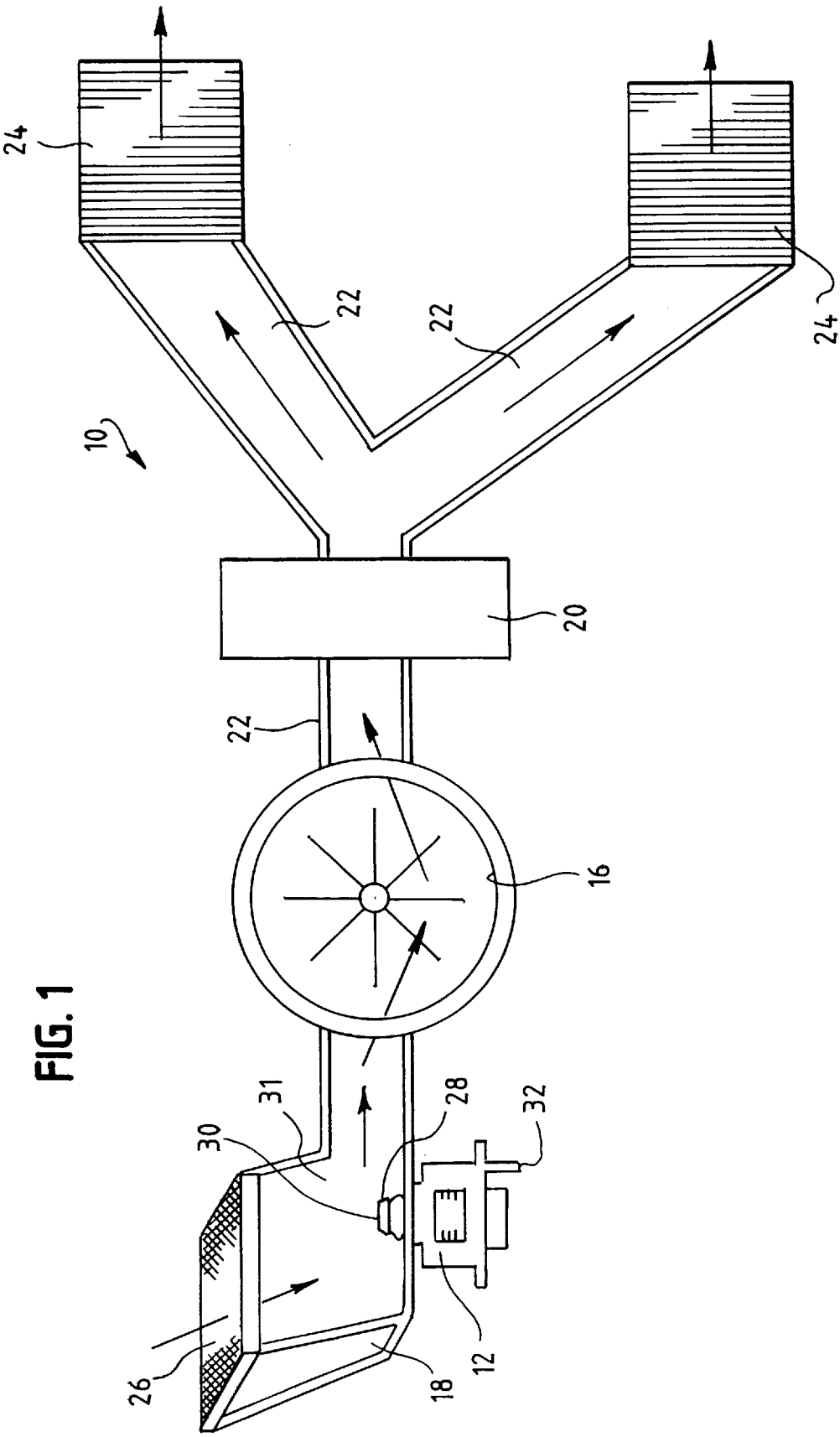
FIG. 1 is schematic view of a micron filtration HVAC system with the indicating device of the present invention connected in a vacuum pressure monitoring position.

Referring now to the drawings, FIG. 1 is schematic view of an HVAC system 10 with an air filter restriction indicating device 12 of the present invention connected in a vacuum pressure monitoring position. The HVAC system 10 includes a conventional fan 16 that draws intake air through an air duct 18 and forces it across a conventional heater/air conditioner core 20 located downstream of the fan 16. Once the air passes across the core 20, it flows through additional air ducts 22 to vents 24 located in the passenger compartment of a vehicle such as an automobile (not shown).

An air filter 26 is positioned in the air duct 18, upstream from the fan 16, to remove contaminates from the intake air. The filter 26 includes a micron filtration element (not shown) designed to remove extremely small particulates, e.g., any particulate greater than 3 microns, from the intake air.

The indicating device 12 includes an integral mounting bracket 28 that extends through an aperture in the intake duct 18. The bracket 28 secures the indicating device 12 as explained in greater detail below.

When the indicating device 12 is used in a negative pressure monitoring position, such as shown in FIG. 1, it is connected to the intake duct 18 at a location between the air filter 26 and the intake of the fan 16. The mounting bracket 28 includes and defines a negative pressure or vacuum port 30 which is in communication with the filtered air flowing through the air duct 18.

Air flowing through the intake region 31 of the duct 16, i.e. the region of the duct between the fan 16 and the filter 26, and thus through the vacuum port 30, is under negative pressure or "vacuum" condition when the fan 16 is operating. This vacuum condition increases, i.e., the air pressure in the duct 16 is reduced, as the filter element (not shown) in the air filter 26 becomes increasing dirty and ultimately clogged. As is explained in greater detail below, the indicating device 12 monitors the vacuum pressure and provides a visual indication of the filter's level of restriction or of how clogged or restricted the filter 26 has become.

Figure 2:
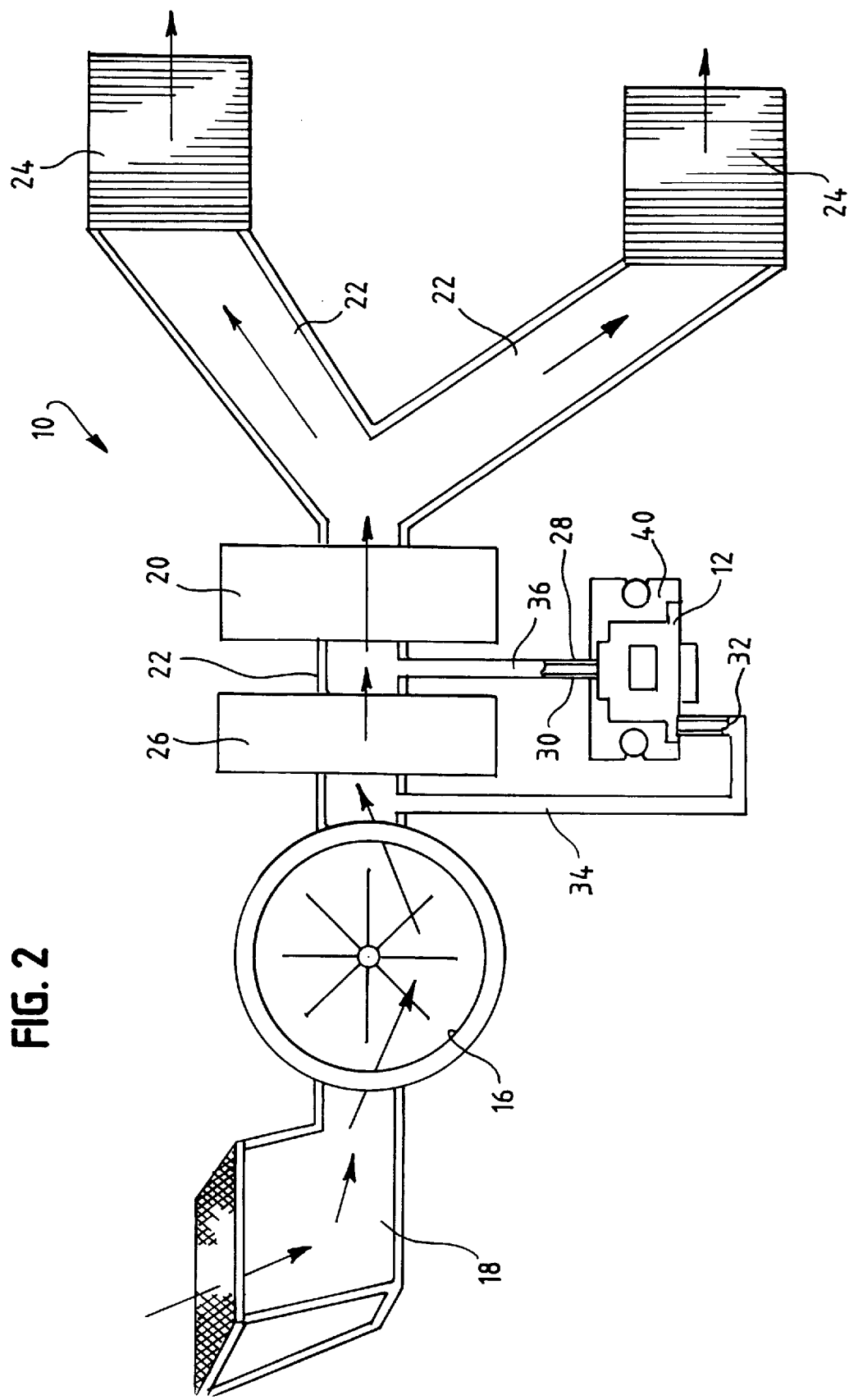
FIG. 2 is schematic view of an HVAC system with the indicating device of the present invention connected in a differential pressure monitoring position.

Referring to FIG. 2, the indicating device 12 is shown connected in a differential pressure monitoring position in which the device 12 measures the pressure drop across the air filter 26. The indicating device 12 also includes a positive pressure port 32 that is connected to the air duct 22 of the HVAC system 10 via by a line 34. (When the indicating device 12 is connected to monitor vacuum pressure, as in FIG. 1, the positive pressure port 32 is vented to the atmosphere.) The line 34 is connected to the air duct 16 upstream of the filter 26, so as to permit monitoring the pressure at the inlet side of the filter. The vacuum port 30 is connected to the duct 22, downstream from the filter 26, via a second line 36 sized to fit over the end of the mounting bracket 28.

When the indicating device 12 is used to measure differential pressure, a mounting plate 40, such as the one described in U.S. Pat. No. 4,369,728, may be used to secure the indicating device 12 in place on the vehicle.

As the filter element in the air filter 26 shown in FIG. 2 becomes increasing dirty, the amount of air passing through the filter 26 is reduced. This reduced air flow results in an increased pressure drop across the filter 26. The indicator device 12 measures the pressure drop across the filter and responsively provides a visual indication of the level of filter clogging.

As noted above, the mounting bracket 28 is utilized to secure the device 12. As best illustrated in FIG. 3, the mounting bracket 28 projects upwardly from the center of the upper end wall 46 of the device 12. The mounting bracket 28 is generally tubular and is sized to receive an elastomeric, e.g. rubber, mounting grommet 50 about its outer diameter. The grommet is secured on the mounting bracket 28 by an increased diameter flange 52 formed at the top of the mounting bracket 28 and a plurality of raised rings or ribs 56 formed in the outer diameter of the mounting bracket 28. The flange 52 has a beveled outer surface 58 which eases insertion of the grommet 50 over the flange and onto the mounting bracket.

The grommet 50 has upper and lower portions 62 and 64 that are positioned above and below the wall 66 of the air duct 18, respectively. The upper and lower portions 62 and 64 are separated by an annular recessed portion 68 having a diameter approximately equal to that of the mounting aperture in the air duct 18 and having a width approximately equal to the wall thickness air duct 18. The upper portion 62 of the grommet 50 has a beveled outer surface 70 which eases insertion of the grommet into the mounting aperture 72 in the air duct 18. The grommet forms an air tight seal between the mounting bracket 28 and the wall 66, and it also reduces the level of mechanical shock imparted on the indicating device 12. The grommet 50 is only employed to connect the indicating device 12 to monitor vacuum pressure, e.g., as in FIG. 1. When the indicating device 12 is connected to measure differential pressures, e.g., as in FIG. 2, the second line 36 is secured over and onto the mounting bracket 28, as was explained above.

Figure 5:
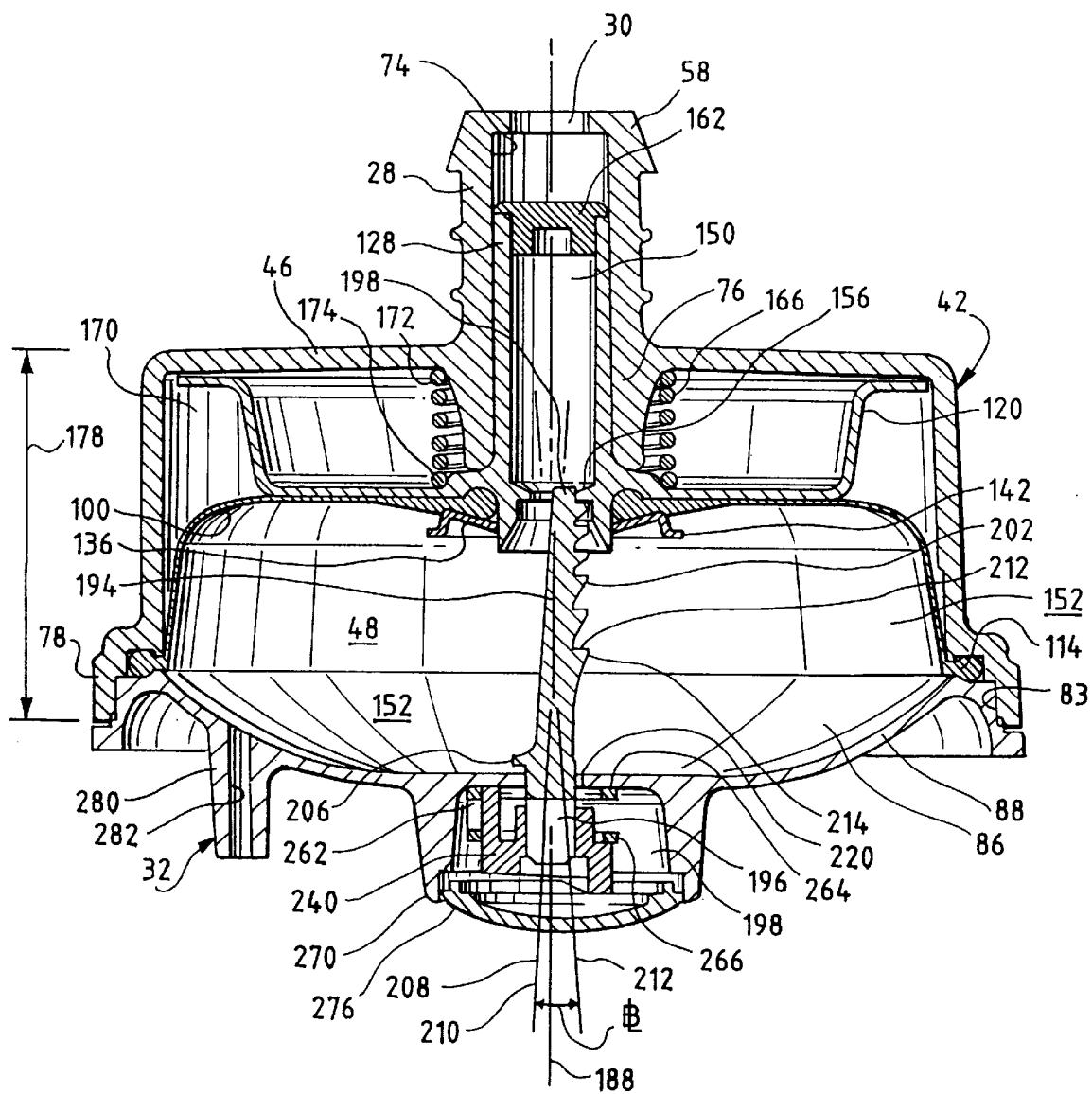
FIG. 5 is a cross-sectional view similar to FIG. 4, with the indicating device being shown in its extended position.

Referring now to FIGS. 4 and 5, the indicating device 12 includes a substantially cylindrical housing 42. The housing 42 comprises an annular side wall 44 and the upper, integral end wall 46 from which, as noted above, the bracket 28 projects. The walls 44, 46 are of a generally uniform thickness and define a internal chamber 48. The housing 42 is preferably molded from a plastic material, such as a polycarbonate. A suitable material is LEXAN grade 103R112 polycarbonate as is available from G.E. Plastics.

The mounting bracket 28 has a central passage or bore 74 for permitting air communication between the air duct 18 and the internal chamber 48. The bore 74 is further defined by a neck 76 which extends downwardly from the end wall 46 and into the internal chamber 48. The bore 74 has a uniform diameter, except at the top of the mounting bracket 28 where it is reduced to define the vacuum port 30.

The lower end of the side wall 44 includes an annular, radially outward offset 78. The offset 78 includes first and second annular, downwardly facing surfaces 80, 82 and an annular, radially inwardly facing surface 83. The offset is sized to receive a dome-shaped base cap 86 which is shown in greater detail in FIGS. 6 and 7. The base cap 86 is preferably made from a material such as polycarbonate. A suitable material is the LEXAN grade polycarbonate described above.

The base cap 86 has a generally dome-shaped bottom wall 88 terminating in an downwardly extending annular flange 92 and serves to further define the internal chamber 48. The flange 92 has a radially outer facing surface 94 which conforms and fits snugly within the radially inner facing surface 83 of the offset 78. The outer surface 94 includes a first, upward facing annular surface 96 which abuts against the first annular surface 80 of the offset 78. The base cap 86 is preferably secured to the housing via sonic welding; however, other conventional means, such as a snap ring or adhesives may also be used to secure the base cap to the housing.

The bottom wall 88 of the base cap is of a generally uniform thickness and its dome-shape increases its structural integrity and rigidity. The increased rigidity of the base cap 86 prevents deflection of the wall 88 due to forces imparted to the bottom wall, thereby maintaining the volume of the internal chamber 48 generally constant.

Figure 8:
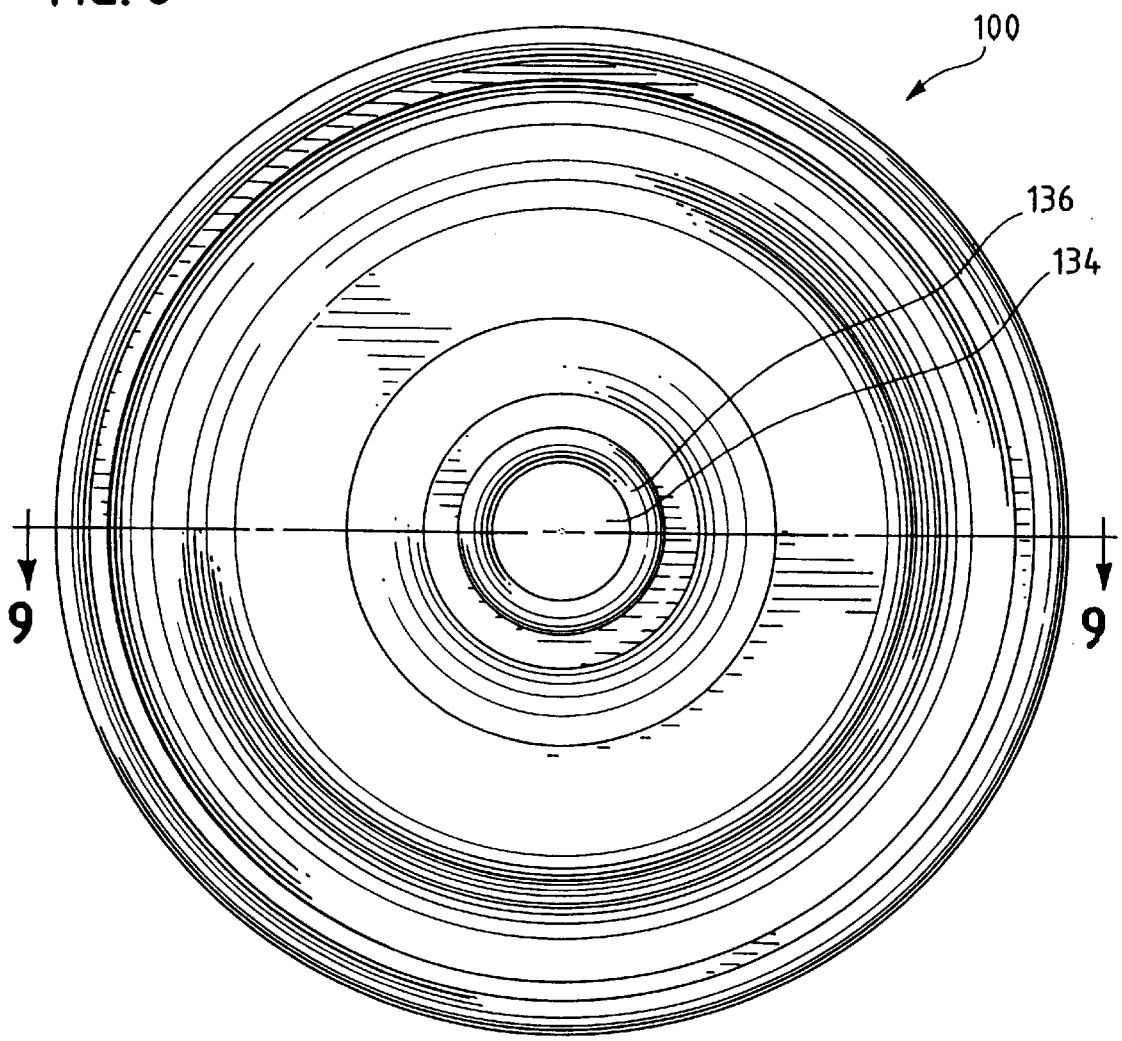
FIG. 8 is a top plan view of a diaphragm employed in the indicator device of the present invention.
Figure 9:
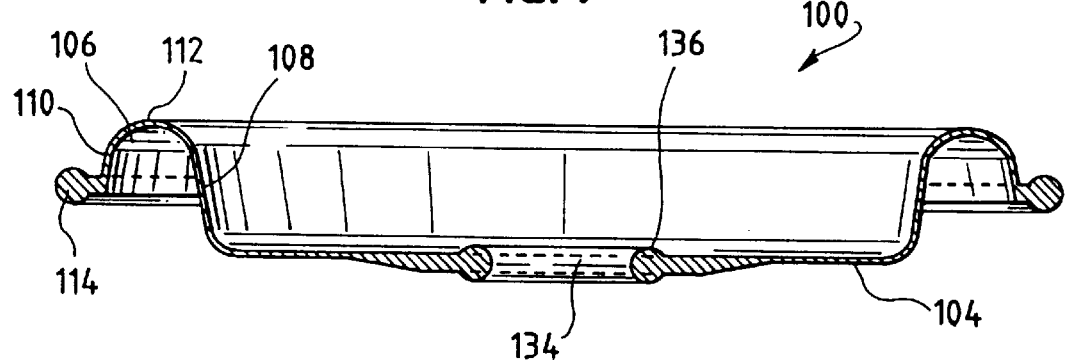
FIG. 9 is a cross-sectional view taken along line 9—9 of FIG. 8.

A rolling diaphragm 100 is disposed within the internal chamber 48 of the housing 42. The diaphragm 100 is formed of a pliable material, such as silicone and has a relatively thin wall thickness (on the order of 0.010") which increases the sensitivity of the indicator device 12 at low vacuum and low differential pressures. As shown in greater detail in FIGS. 8 and 9, the diaphragm 100 has a generally planar bottom wall 104 and an integral side wall 106. The side wall 106 has a generally U-shaped cross section and consists of inner and outer portions 108, 110 connected by a convex upper portion 112. The outer distal edge of the portion 110 terminates in an annular bead seal 114 which is compressed and held between the first surfaces 82, 96 of the offset 78 and the flange 92. The first surfaces 82, 96 include radially raised inner edges to define a seat for the bead seal 114. This fixes the relative position of the bead seal 114, and hence the edge of the side wall outer portion 110, within the inner chamber 48. The bead seal 114 prevents air from passing between the housing 42 and the base cap 86.

Referring again to FIGS. 4 and 5, an upright, generally cup-shaped indicating member 120, formed of rigid molded plastic, is seated upon the bottom wall 104 of the diaphragm 100. As can be seen by referring additionally to FIGS. 4, 5, 10 and 11, the indicating member 120 has a bottom wall 122 overlying the bottom wall 104 of diaphragm 100 and an integral, upwardly extending annular side wall 124 that terminates in a radially outwardly extending indicator rim 126. The outer edge of the rim 126 may be brightly colored and may serve as a readily visible indicator such that its vertical position within the chamber 48 indicates the amount of restriction or extent of contamination of the filter element in the air filter 26. When the indicating member 120 is in its reset position (see, e.g., FIG. 4), the shape of the diaphragm 100 conforms generally to that of the indicating member 120. In particular, the bottom wall 122 of the indicating member 120 seats against the bottom wall 104 of the diaphragm 100, the side wall 124 of the indicating member 120 seats against the inner portion 100 of the diaphragm side wall and the rim 126 of the indicating member 120 seats against the upper portion 112 of the diaphragm 100.

Figure 10:
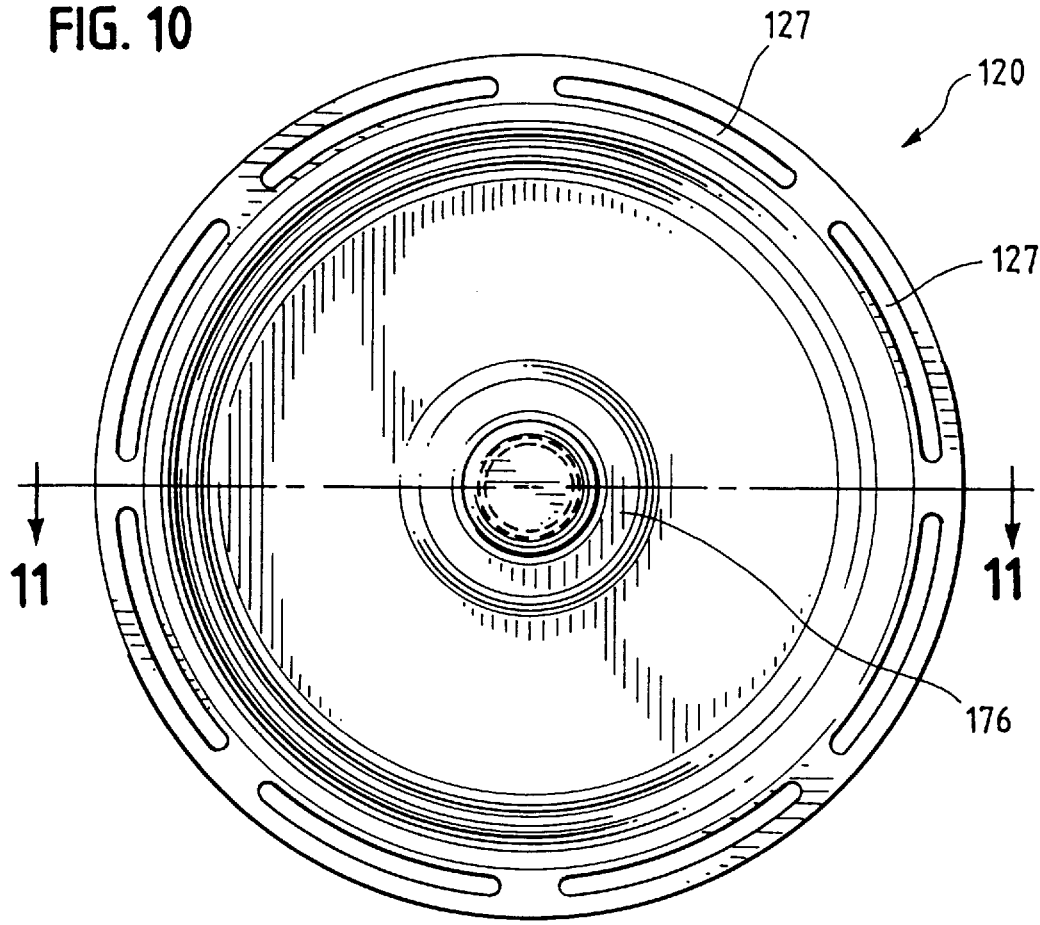
FIG. 10 is a top plan view of an indicating member employed in the indicating device.

As can be seen in FIG. 10, a plurality of openings or voids 127 are formed in the rim 126. The openings 127 reduce the mass of the indicating member 120, thereby making the member 120 less susceptible to movement induced by physical shock, e.g., vibration, that the indicating device 12 may experience in normal use.

The indicating member 120 also includes an integrally formed, centrally disposed, tubular guide post 128. The guide post 128 extends upwardly from the bottom wall 122 and into the bore 74. The outer diameter of the guide post 128 is slightly less than the inner diameter of the bore 74 so that air may pass therebetween and so that the guide post 128 may freely slide within the bore 74.

The guide post 128 includes an integral lower portion 130 that extends downwardly from its bottom wall 122 and through a central opening 134 (see FIGS. 8 and 9) in the bottom wall 104 of the diaphragm 100. The diaphragm central opening 134 is defined by an integrally formed bead seal 136 which fits tightly around the outer diameter of the guide post 128 (see FIG. 4). Specifically, the bead seal 136 seats in a recess formed at the junction of the bottom wall 122 and the guide post's lower portion 130.

Figure 12:
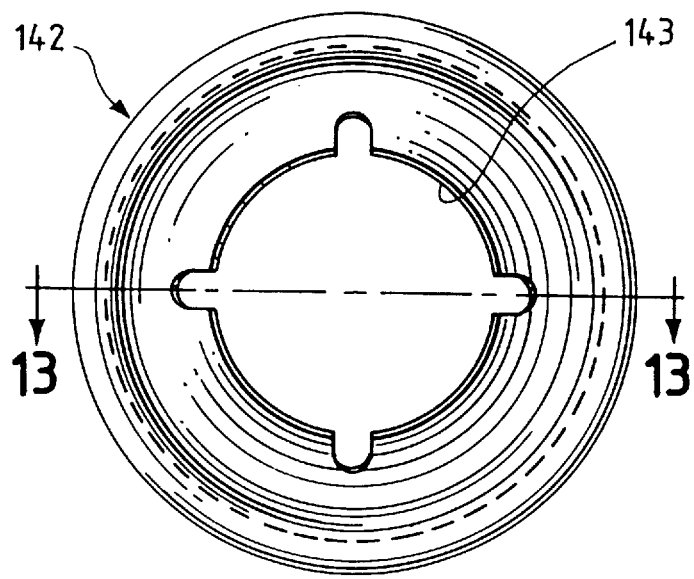
FIG. 12 is a top plan view of a speed nut employed in the indicating device of the present invention.
Figure 13:
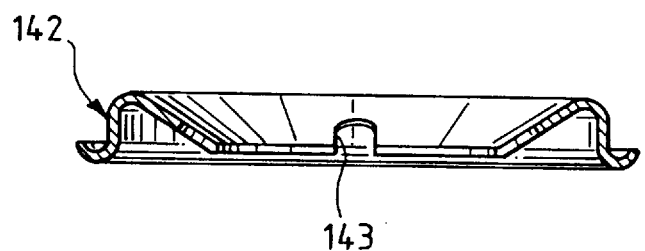
FIG. 13 is a cross-sectional view taken along line 13—13 of FIG. 12.

The diaphragm 100 is secured to the indicating member 120 by a fastener 142, such as a speed nut, which is secured on the lower portion 130 of the guide post 128. As shown in FIGS. 12 and 13, the speed nut 142 is dish shaped and includes an central aperture 144 configured to be press fitted over or onto the guide post's lower portion 130. Other means, such as adhesives and/or other mechanical fasteners may also be employed to connect the diaphragm 100 to the indicating member 120.

Figure 11:
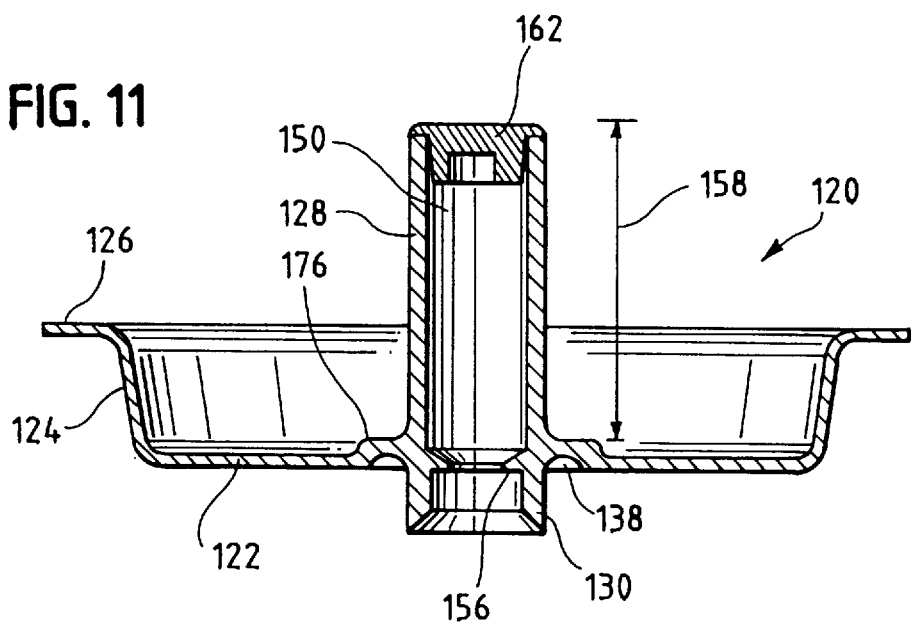
FIG. 11 is a cross-sectional view taken along line 11—11 of FIG. 10.

The guide post 128 has a central coaxial bore 150 that opens into the lower portion 152 of the chamber 48, i.e. the portion of the chamber 48 below the diaphragm 100. The bore 150 includes an integrally formed, radially inwardly projecting, annular flange 156. The flange 156 lies in substantially the same horizontal plane as the bottom wall 122 of the indicating member 120. As shown in FIG. 11, the upper portion of the guide post 128, i.e. the portion of above the bottom wall 122, has a length 158 so that it cannot to be fully withdrawn from within bore 74 when the diaphragm 100 is at its lowermost, reset position. The upper end of the bore is sealed by a cap 162 which prevents air from passing into or out of the lower portion 152 of the chamber 48 via the bore 150.

The cap 162 is made from rigid molded plastic and may be connected to the guide post 128 via sonic welding and/or a suitable adhesive. It should be appreciated that the cap 162 could also be integrally formed with the guide post 128.

As illustrated in FIGS. 4 and 5, a coil compression spring 166 is disposed within the upper portion 170 of the chamber 48, i.e. the portion above the diaphragm 100. The spring 166 is mounted coaxially about the guide post 128 and the neck 76. The spring 166 has an upper end 172 that bears against the inner, lower side of the end wall 46 and a lower end 174 that bears against the upper surface of the bottom wall 122 of the indicating member 120. This upper surface may include a central, annular raised portion 176, or alternatively, a recess (not shown), defining a seat for the lower end 174 of the spring 166. Similarly, the neck 176 may increase in diameter adjacent the end wall 46, so that at its junction with the end wall 46, the neck 76 has an outer diameter that is approximately equal to, but less than, the inner diameter of the spring 166. A recess (not shown) may also be formed at the junction of the neck 76 and the end wall 46 to define a seat for the upper end 172 of the spring 166.

The spring 166 normally biases the diaphragm 100 and indicating member 120 toward their lowermost or reset position as illustrated in FIG. 4. The spring 166 is compressible to permit the diaphragm and the member 120 to move towards their uppermost or extended position, as illustrated in FIG. 5 in response to vacuum pressure in the upper portion 170 of chamber 48 and/or positive differential pressure in the lower portion 152 of chamber 48 vis-a-vis the pressure in the portion 170 of the chamber.

The diaphragm 100 is made and designed so that it does not stretch as the indicating member 120 moves between its reset and extended positions. Rather, as the indicating member 120 moves upwardly towards its extended position, the outer portion 110 of the diaphragm's side wall 106 unfolds, about the upper portion 112. Because the diaphragm does not stretch during operation of the indicating device 120, the effective surface area of the diaphragm 100, as defined by its bottom wall 104 and the upper portion 112 of the side wall 106, remains generally constant as the diaphragm 100 moves between its extended and reset positions. As a result, the indicating device 120 has generally linear response rate over its intended operating range. Moreover, because the inner and outer portions 108, 110 of the side wall 106 are generally disposed parallel to the vertical axis of the spring 166, pressure differentials acting across these portions do not oppose or affect the force being exerted by the spring 166.

Because the guide post bore 74 extends above the housing end wall 46 and into the mounting bracket 28, the height of the housing 42 (and particularly the portion of the housing extending outside of the air duct 16) may be made relatively small while still permitting a more than satisfactory length or degree of linear travel by the indicating member 120. As a result, less space is required for mounting the indicating device 12.

As noted above, the upper portion 170 of the chamber 48 is sealed from the exterior atmosphere and is in direct communication with the air in the air duct 16. Thus contaminants in the atmosphere surrounding the device 12 do not affect the operation of either the indicating member 120 or the spring 166. The diaphragm is tightly sealed at and by its outer and inner bead seals 114, 136, as was detailed above. These bead seals 114, 136 prevent any air communication between lower and upper portions 152 and 170 of the chamber 48.

As best illustrated in FIG. 3, the side wall 44 of the housing 42 includes a transparent portion or window 180. A plurality of vertically spaced, horizontal lines or bands 182 may be placed across the transparent portion 180 and may serve as a visual indication, together with the indicator rim 126 of the indicating member 120, of the restriction level or degree of restriction of the filter element in air filter 26. For example, when the rim 126 reaches the uppermost band 182, this may be used to signify that the filter element is fully restricted and requires cleaning or replacement. The particular indicia lines, however, shown in the drawings are merely for illustration.

As can best be seen in FIGS. 6 and 7, the bottom wall 88 of the base cap 86 has a centrally disposed, relatively small diameter hole 184 formed therein. The bottom wall 88 also includes an integrally formed, annular or tubular wall 186 that extends downwardly from the bottom surface of the bottom wall, concentrically about the hole 184 and about the central, vertical axis, as shown at 188, of the indicating device 12.

Referring additionally to FIGS. 14 and 15, an elongated plastic locking member 194 is disposed within the hole 184. The locking member 194 has a lower portion 196 that projects through the hole 184 and that is disposed in the space 197 defined by the tubular wall 186. The locking member 194 has upper portion 198 which extends or projects upwardly into the bore 150 in guide post 128 and past the flange 156. The length of the upper portion 198 of the member 194 (this length is indicated at 200 in FIG. 14) is such that the portion 198 remains within the bore 150 and extends past the flange 156 even when the diaphragm 100 and the indicating member 120 are moved to their fully upwardly extended position as shown in FIG. 5.

The upper portion 198 of the locking member 194 has a plurality of teeth or notches 100 formed on its side. Each tooth 202 is adapted to engage the flange 156 when it is brought into contact with the flange 156. These teeth will be described hereinafter in further detail.

The locking member 194 also includes a partial, transverse flange 206 that is integrally formed at the junction of its upper and lower portions 196, 198 and that extends, in a transverse, radial direction, from the side of the member 194 opposite to that of the teeth 202. Taken at the flange 206, the member 194 and the flange 206 have a transverse dimension that is greater than the diameter of the hole 184 in the base cap's bottom wall 88. The flange 206 rests on the upper surface of the bottom wall 88, adjacent to the hole 184 and serves as a pivot or pivot point about which the upper and lower portions 196 and 198 of the locking member 194 may be rocked or moved. As is illustrated in FIGS. 4 and 5, the locking member 194, and more specifically, its central longitudinal axis 208 may be moved through an arc β about the central axis 188 of the indicating member 12, between a first position 210 at which the teeth 202 are positioned to engage the flange 156 and a second position 212 at which the teeth are laterally or transversely spaced and disengaged from the flange 156. In other words when the locking member 194 is disposed in the first position 210, one of the teeth 202 can be engaged with the flange 156 in the bore 150 as shown in FIG. 5.

The locking member 194 includes a flat portion 218 on the side opposite from the flange 206. The hole 184 in the base cap bottom wall 88 also includes a flat portion 220. The flat portions 218 and 220 abut against each other to maintain the proper orientation of the locking member 194 within the hole 184.

The lower portion 196 of the locking member 184 includes a generally cylindrical portion 222. The portion 222 includes a longitudinally extending, transverse groove 226 whose side walls are disposed in planes that are generally perpendicular to the flat portion 118. The groove 226 bifurcates the portion 222 into two sections 228 and 230 that respectively have radially outwardly extending flanges 232, 234 formed on their lower ends. As is shown in FIGS. 4 and 5, the portion 222 carries a separately formed annular reset button 240.

Referring additionally to FIGS. 16 and 17, the reset button 240 has a radially outwardly extending flange 242 on its lower end and a central bore 244 sized to receive the cylindrical portion 222 of the locking member 194. The reset button 120 is snap-fitted over the portion 222. The button 240 is secured in place on the portion 222. When in place, the flanges 232, 234 abut an internal, partial shoulder 246 in the bore 244. The shoulder 246 includes a flat section 248 that is adapted to abut the flat portion 218 so that the member 194 cannot be rotated relative to the button.

An integral finger 250 is formed on the upwardly facing, outer surface of the button 240. When the button 240 and the locking member 194 are secured together the finger 250 is positioned on the same side of the locking member 194 as the flange 206. Similarly (i.e. when the button 240 and member 194 are properly secured together), the finger 250 extends vertically upwardly from the button 240 in a direction generally parallel to the axis 208 of locking member 194. The upper end of the finger 250 is spaced above the upper face 254 of the reset button 240 (see FIG. 17). When the reset button 240 and locking member 194, are mounted on the device 12 (as shown in FIGS. 4 and 5), the distance between the upper end of the button and the lower surface of the flange 206 is slightly greater than the thickness of the bottom wall 88 of the base cap 86. The upper end of the finger 250 fits between a pair of integral projections 256, 258 that are in the lower facing surface of the bottom wall 88 adjacent the hole 184 (see FIGS. 6 and 7).

A conventional leaf compression spring 262 is disposed about the lower portion 196 of the locking member 194 and extends between the base cap bottom wall 88 and the upper face of the button 240. More specifically, the upper leg 264 of the spring 262 abuts against the bottom surface of the bottom wall 88 and the lower leg 266 of the spring abuts against the upper face of the flange 242. The spring 262 urges the reset button 240 against the annular flanges 232, 234 of the locking member 194 and away from the bottom wall 88 of the base cap 86.

As best shown in FIGS. 4 and 5, the lower portion 196 of the locking member 194 and the reset button 240 lie slightly above a plane defined by the bottom edge of the bottom end 270 of the tubular wall 186. The lower end 270 of the tubular wall 186 includes an increased diameter counterbore for receiving a cover 276. The cover 276 is generally dome-shaped and is made from a relatively flexible material such as rubber or a soft plastic. The cover 276 is snap-fitted into the counterbore in the tubular wall 186 and is further secured within the counterbore by for example, an adhesive. The cover 276 seals the space defined by the tubular wall 186 from the exterior atmosphere.

Referring to FIGS. 3 and 4, the positive pressure port 32 is defined by an annular projection 280 extending downwardly from the bottom wall 88 of the base cap 86. The projection 280 includes a central passage 282 that is open to the atmosphere at its lower end and open to the lower portion 152 of the internal chamber 48 at its upper end. A conventional filter medium 284 (shown in FIG. 6) may be positioned in the central passage 282. This filter medium 284 prevents the entry of dirt or dust particles into the lower portion 152 of the chamber 48 via the port 32.

When a person presses the cover 276 upwardly, i.e., toward the bottom wall 88, the cover 276 abuts the lower surface of the reset button 240. This causes the locking member 194 to pivot about the flange 206 toward the central axis 188 of the indicating device 12. Continued pressure on the cover 276 forces the upper portion 198 of the locking member 194 to pivot beyond the central axis 188 to its second position so that the teeth 202 are swung out of engagement with the flange 156. When this occurs, the spring 166 will return the diaphragm 100 and indicating member 120 to their lowermost reset positions, as shown in FIG. 4; provided, of course, that vacuum in the upper portion 170 of the chamber 48 and/or any positive pressure in the lower portion 152 of the chamber does not preclude such movement of the diaphragm and the member.

Referring again to FIG. 14, the top edge or surface 216 of each tooth 202 extends generally perpendicularly to the central axis 208 of the locking member 194. The bottom edge or flat portion 218 of each tooth 202 extends downwardly and radially inwardly from the distal end of the top edge 216 of the adjacent, upper tooth. The shape of the teeth 202 permits the indicating member 120 to be drawn upwardly with respect to the locking member 194 but prevents downward movement of the indicating member along the locking member 194 unless the locking member is manually moved to its second position. As the indicating member 120 moves upwardly along and with respect to the locking member 194, the flange 156 engages the angled, lower flat portion 218 of the teeth 202 and biases the locking member 194 toward its second position. Upward movement of the member 120 will occur in response to a pressure differential, between the air pressure in the portions 152 and 170 of the chamber 48, across the diaphragm 100 (i.e. with the pressure of the air in portion 170 being less than that in portion 152).

Figure 18:
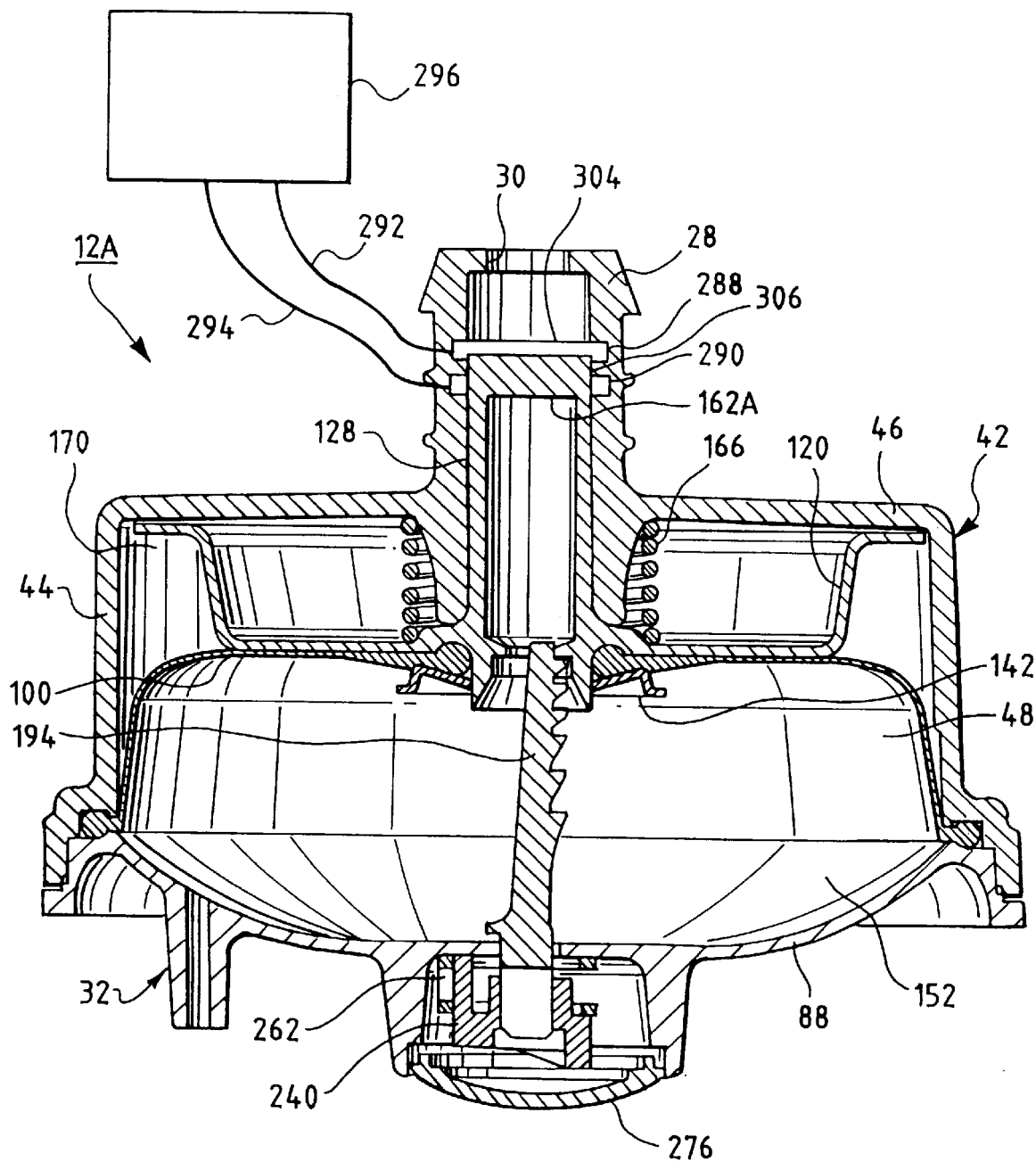
FIG. 18 is a central vertical cross-sectional view illustrating one method for adapting the indicating device to produce an electrical output indicative of filter restriction level.

FIG. 18 illustrates an embodiment of the indicating device, denoted as device 12A, that has been modified to produce an electrical signal indicating the level of filter clogging. The indicating device 12A utilizes the same structure as and functions like the above described indicating device 12 except for the differences that will be discussed. More particularly, the indicating device 12A includes a pair of annular, vertically spaced conductors 288, 290 positioned in the side wall of the bore 74. Each of the annular conductors 288, and 290 is connected respectively, via a conductive wire 292 and 294, to an external indicating circuit denoted generally by 296. The indicating circuit, 296 may, for example, include an indicator lamp and a power source such as the vehicle battery.

The top of the guide post 128 includes a cap 162A. An electrically conductive cover 304 is positioned over the top of the cap 162A. The cover 304 includes an annular side wall 306 which is longer, in the vertical direction, than the distance between the annular conductors 288 and 290. The annular conductors 288 and 290 and the cover 304 are positioned and dimensioned such that the cover 304 extends between and electrically contacts both annular conductors 288 and 290 when the guide post 128 reaches its uppermost, extended position, as shown in FIG. 18. When this occurs, the lamp in the circuit 296 is energized by the circuit's power source to indicate the filter 26 needs to be cleaned or replaced.

Figure 19:
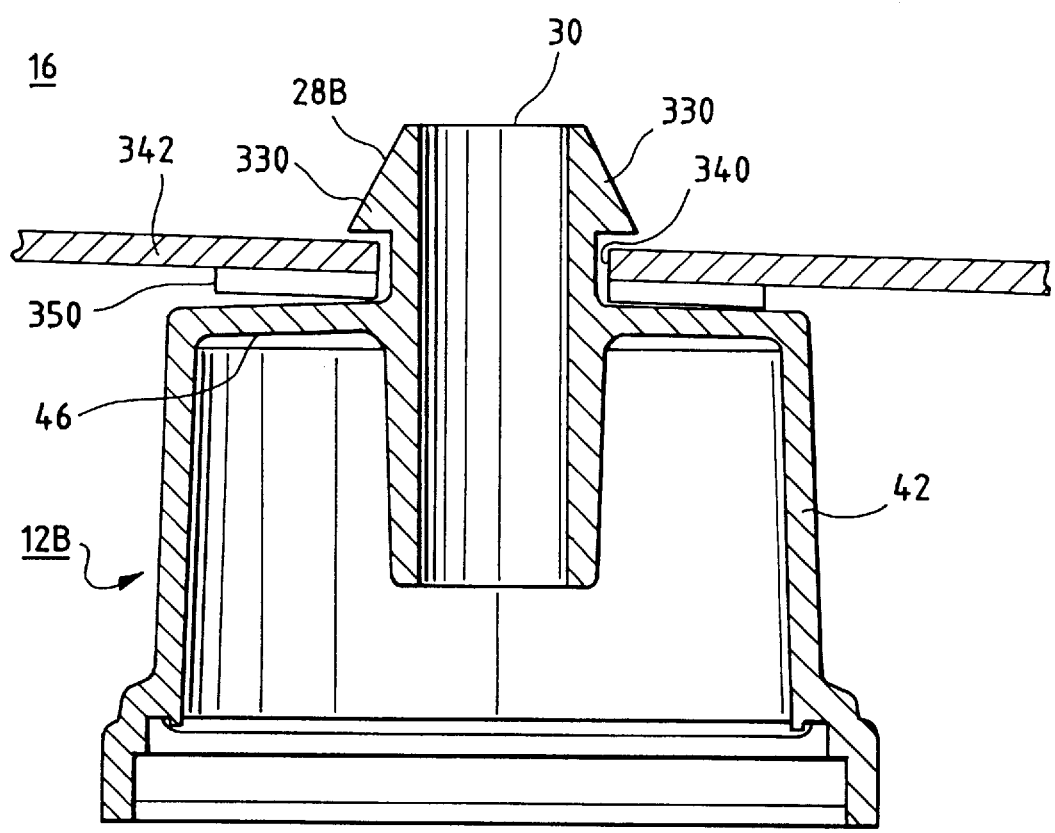
FIG. 19 is a partial section view illustrating an alternative mounting bracket for the indicating device.

Turning now to FIG. 19, an indicating device 12B, that employs an alternative mounting bracket 28B, is described. Except as hereinafter noted, the indicating device 12B is structurally and functionally the same as the indicating device 12. The mounting bracket 28B is generally tubular and has a reduced height vis-a-vis the previously described mounting bracket 28. A pair of diametrically opposed, triangular-shaped flanges 330 extend outwardly from the top of the mounting bracket 28B, and are designed to be received within a similarly shaped and sized mounting aperture 340 formed in the wall 342 of the air duct 16. After the indicating device 12B is inserted into the aperture 340 so that the lower facing surfaces of the flanges 330 clear the air duct wall, the device is then rotated, e.g., a quarter turn, to secure the mounting bracket 28B with the mounting aperture 340. The lower edges of the flanges 330 may be beveled to draw the housing 42 toward the wall 342 of the air duct 16 when the mounting bracket 28C is rotated in the aperture 340.

An elastomeric seal 350 is positioned on the end wall 46 around the mounting bracket 28B. The distance between the top of the end wall 46 and the bottom of the flanges 330 is such that the seal 350 is compressed between the air duct wall 342 and the end wall 46 to seal the air duct from the atmosphere In the preferred embodiment, the effective cross-sectional area of the diaphragm, i.e. the area that the pressure differential acts on to oppose the force of the spring 166 is about 3.8 square inches, the height 178 is about 1.2 inches, and the distance 158 is about 0.9 inches (which is the travel distance of the indicating member 120). The vertical distance between the upper end of the mounting bracket and the lower end of the flange 92 is about 2.1 inches, between upper end of the mounting bracket 28 and the closure 276 is about 2.7 inches, and between the upper surface of the upper wall 46 and the upper end of the mounting bracket 28 is about 0.8 inches. The outer-most diametrical dimension, measured adjacent to the flange 92 is about 3.0 inches.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

I claim:

1. An improved air filter restriction indicating device for measuring very low ranges of filter restriction (e.g., 0.0 to 1.5 in. of $H_2O$ or 0.0 to 0.054 psi) in a micronfilter used in a vehicular heating/ventilation/air conditioning (HVAC) system, the improved indicating device comprising: a housing having a first end, a second end, and a side wall that includes a transparent portion, with the first and second ends and side wall of the housing defining a generally cylindrical overall chamber in the housing and with the second end having an opening therein; a flexible diaphragm which has a variable thickness and which is disposed within the housing, with the diaphragm having a central portion, which includes a generally planar bottom wall, and relatively thin, integrally formed, generally U-shaped rolling side wall, which has an edge portion secured to the housing so that the diaphragm divides the overall chamber into a first sub-chamber, adjacent to the first end of the housing, and a second sub-chamber, adjacent to the second end of the housing, and with the central portion of the diaphragm being movable between a reset position where the diaphragm is adjacent to the second end of the housing and an extended position where the diaphragm is adjacent to the first end of the housing; an indicating member that is disposed within the first sub-chamber of the housing and that is mounted on and carried by the diaphragm, at least a portion of the indicating member being visible through the transparent portion of the side wall of the housing as the diaphragm moves between its reset position and its extended position; means for permitting air communication between the air flowing in the HVAC system and the first sub-chamber in the housing; a compression spring disposed in the first sub-chamber of the housing, with one end of the compression spring being in contact with the first end of the housing and the other end of the compression spring being in contact with the indicating member, with the compression spring normally biasing the diaphragm and the indicating member toward the reset position and having a compression force sufficient to balance the differential pressures between the first and second sub-chambers that are experienced while the indicating device is measuring the very low ranges of filter restriction normally found in the HVAC system so that the diaphragm will be positioned in its reset position when the air flow through the HVAC system filter is unrestricted, due to entrapped dirt and the like, and so that the diaphragm, and the indicating member, will be moved from the reset position progressively toward the extended position in response to increases in the restriction of air flow through the HVAC system filter.

2. The improved air filter restriction indicating device of claim 1 further comprising lock-up means for progressively locking the indicating member in the various positions which the diaphragm and indicating member attain within the first chamber, between the reset position and the extended position, as the diaphragm and the indicating member moves from the reset position to the extended position and for maintaining the indicating member in its last such position even though the diaphragm member may thereafter return towards the reset position; and wherein the lock-up means includes a centrally disposed cylindrical rod which is mounted on and carried by the central portion of the diaphragm, which is in part disposed in the first chamber, and which projects from the diaphragm toward the first end of the housing; wherein the cylindrical rod has a closed end that projects towards the first end of the housing, a recess that is in communication with the second chamber through an open end, and a flange that extends into the recess between the open and closed ends of the cylindrical rod and that is adjacent to the open end of the cylindrical rod; wherein the lock-up means also including an elongated locking member having a first end and a second end, with the locking member being supported, for pivotal movement intermediate its ends, by a first portion of the second end of the housing, so that the second end of the locking member may be selectively, pivotally moved in the recess in the cylindrical rod through a predetermined arc, and with the second end of the locking member normally being disposed adjacent to the open end of the cylindrical rod and cooperating with the flange of the cylindrical rod so that the indicating member is progressively locked and maintained in position by engagement between the second end of the locking member and the flange of the cylindrical rod.

3. The improved air filter restriction indicating device of clam 2 which includes means for selectively pivoting the first end of the locking member through the predetermined arc and thus causing the second end of the locking means to pivot through the predetermined arc, in the recess in the cylindrical rod; wherein the pivoting means including means carried by the first end of the locking member; wherein a relatively flexible resetting cover which has an external surface and an internal surface, which is mounted on a second portion of the second end of the housing spaced from the first portion of the second end of the housing in a direction parallel to the path of movement of the indicating member, and which is disposed adjacent to the carried means and in a plane substantially perpendicular to the path of movement of the indicating member; wherein the resetting cover being deformable toward the first portion of the second end of the housing when force is exerted against its external surface so that the internal surface of the resetting cover will contact the carried means when the resetting cover is deformed and will thereby cause the first end of the locking member to be pivoted through the predetermined arc.

4. The improved air filter indicating device of claim 1 wherein the second end of the housing has a domed shape.

5. The improved air filter indicating device of claim 1
wherein the first end of the housing includes a first end wall;
wherein the indicating member further includes a guide post which projects from the indicating member towards the first end wall of the housing; and
wherein a mounting bracket for the device extends externally from the first end wall of the housing, the mounting bracket defining a guide bore for receiving the guide post as the indicating member moves within the internal chamber, the guide bore extending externally beyond the first end wall of the housing.

6. The improved air filter indicating device of claim 1, wherein the diaphragm is made from a pliable, substantially non-stretchable material; and wherein the side wall is approximately 0.010 inches thick.

7. The improved air filter indicating device of claim 6 wherein the diaphragm is configured such that the effective surface area of the diaphragm against which the differential pressure operates remains generally constant throughout its movement between its extended and retracted positions.

8. The improved air filter indicating device of claim 1 further comprising means for producing an electrical signal indicative of the level of filter clogging.

9. The improved air filter indicating device of claim 1, wherein the device has a generally linear response rate over its operating range.

10. An improved air filter restriction indicating device for measuring filter restriction in an air circulation system having operating pressures on the order of 0.0 to 1.5 in. of $H_2O$ (i.e., 0.0 to 0.054 psi) and having a micronfilter positioned in the system, the improved indicating device comprising:

a housing having a first end, a second end, and a side wall that includes a transparent portion, the first and second ends and side wall defining a generally cylindrical chamber within the housing;

a flexible, substantially non-stretchable diaphragm which has a variable thickness and which is disposed within the housing chamber, the diaphragm having a generally planar central portion and a relatively thin, integrally formed, rolling side wall having an outer edge secured to the housing so that the diaphragm divides the chamber into a first sub-chamber, adjacent to the first end of the housing, and a second sub-chamber, adjacent to the second end of the housing, the central portion of the diaphragm being movable between a reset position where the diaphragm central portion is adjacent to the second end of the housing and an extended position where the diaphragm central portion is adjacent to the first end of the housing;

an indicating member disposed within the first sub-chamber of the housing and being mounted on and carried by the diaphragm, at least a portion of the indicating member being visible through the transparent portion of the side wall of the housing as the diaphragm moves between its reset position and its extended position;

means for permitting air communication between the air flowing in the air circulation system and the first sub-chamber in the housing; and a compression spring disposed in the first sub-chamber of the housing, with one end of the compression spring being in contact with the first end of the housing and the other end of the compression spring being in contact with the indicating member, with the compression spring normally biasing the diaphragm and the indicating member toward the reset position and having a compression force sufficient to balance the differential pressures between the first and second sub-chambers that are experienced while the indicating device is measuring filter restriction in a circulation system having operating pressures on the order of 0.0 to 1.5 inches of $H_2O$ so that the diaphragm will be positioned in its reset position when the air flow through the air circulation system filter is unrestricted, due to entrapped dirt and the like, and so that the diaphragm, and the indicating member, will be moved from the reset position progressively toward the extended position in response to increases in the restriction of air flow through the air filter.

11. The improved air filter indicating device of claim 10 further comprising lock-up means for progressively locking the indicating member in the various positions which the diaphragm and indicating member attain within the first chamber, between the reset position and the extended position, as the diaphragm and the indicating member moves from the reset position to the extended position and for maintaining the indicating member in its last such position even though the diaphragm member may thereafter return towards the reset position.

12. The improved air filter restriction indicating device of claim 11 wherein the lock-up means includes a centrally disposed cylindrical rod which is mounted on and carried by the central portion of the diaphragm, which is in part disposed in the first chamber, and which projects from the diaphragm toward the first end of the housing; wherein the cylindrical rod has a closed end that projects towards the first end of the housing, a recess that is in communication with the second chamber through an open end, and a flange that extends into the recess between the open and closed ends of the cylindrical rod and that is adjacent to the open end of the cylindrical rod; wherein the lock-up means also including an elongated locking member having a first end and a second end, with the locking member being supported, for pivotal movement intermediate its ends, by a first portion of the second end of the housing, so that the second end of the locking member may be selectively, pivotally moved in the recess in the cylindrical rod through a predetermined arc, and with the second end of the locking member normally being disposed adjacent to the open end of the cylindrical rod and cooperating with the flange of the cylindrical rod so that the indicating member is progressively locked and maintained in position by engagement between the second end of the locking member and the flange of the cylindrical rod.

13. The improved air filter restriction indicating device of claim 12 which includes means for selectively pivoting the first end of the locking member through the predetermined arc and thus causing the second end of the locking means to pivot through the predetermined arc, in the recess in the cylindrical rod; wherein the pivoting means including means carried by the first end of the locking member; wherein a relatively flexible resetting cover which has an external surface and an internal surface, which is mounted on a second portion of the second end of the housing spaced from the first portion of the second end of the housing in a direction parallel to the path of movement of the indicating member, and which is disposed adjacent to the carried means and in a plane substantially perpendicular to the path of movement of the indicating member; wherein the resetting cover being deformable toward the first portion of the second end of the housing when force is exerted against its external surface so that the internal surface of the resetting cover will contact the carried means when the resetting cover is deformed and will thereby cause the first end of the locking member to be pivoted through the predetermined arc.

14. The improved air filter indicating device of claim 10 wherein the second end of the housing has a domed shape.

15. The improved air filter indicating device of claim 10, further comprising a mounting bracket extending from the first end of the housing and defining an opening to the first sub-chamber, the mounting bracket being adapted for insertion into the duct of the air circulation system downstream of the microfilter to permit air communication between the air flowing in the air circulation system and the first sub-chamber in the housing.

16. The improved air filter indicating device of claim 10, further comprising:
   a first end wall;
   a guide post which projects from the indicating member towards the first end wall of the housing;
   a mounting bracket extending externally from the first end wall of the housing and defining an opening to the first sub-chamber, wherein the mounting bracket includes a guide bore for receiving the guide post as the indicating member moves within the internal chamber, the guide bore extending externally beyond the first end wall of the housing.

17. The improved air filter indicating device of claim 10 wherein the diaphragm is configured such that the effective surface area of the diaphragm against which the differential pressure operates remains generally constant throughout its movement between its extended and retracted positions.

18. The improved air filter indicating device of claim 10 further comprising means for producing an electrical signal indicative of the level of filter clogging.

19. The improved air filter indicating device of claim 10, wherein the side wall of the diaphragm is generally U-shaped.

20. The improved air filter indicating device of claim 19, wherein the diaphragm includes at least one integrally formed bead seal having an increase thickness relative to the diaphragm side wall.

21. The improved air filter indicating device of claim 20, wherein the diaphragm includes an inner radial bead seal and an outer radial bead seal.

22. The improved air filter indicating device of claim 20, wherein the diaphragm side wall has a thickness of approximately 0.010 inches.

23. The improved air filter indicating device of claim 10, wherein the device has a generally linear response rate over its operating range.

24. An improved air filter restriction indicating device for measuring very low ranges of filter restriction (e.g., 0.0 to 1.5 in. of $H_2O$ or 0.0 to 0.054 psi) in a microfilter positioned in an air duct used in a vehicular heating/ventilation/air conditioning (HVAC) system, the improved indicating device comprising:
   a housing having a first end, a second end, and a side wall that includes a transparent portion, the first and second ends and side wall defining a generally cylindrical chamber within the housing;
   a flexible, substantially non-stretchable diaphragm which has a variable thickness which is disposed within the housing chamber, the diaphragm having a generally planar central portion and a relatively thin, integrally formed, rolling side wall having an outer edge secured to the housing so that the diaphragm divides the chamber into a first sub-chamber, adjacent to the first end of the housing, and a second sub-chamber, adjacent to the second end of the housing, the central portion of the diaphragm being movable between a reset position where the diaphragm central portion is adjacent to the second end of the housing and an extended position where the diaphragm central portion is adjacent to the first end of the housing;
   an indicating member disposed within the first sub-chamber of the housing and being mounted on and carried by the diaphragm, at least a portion of the indicating member being visible through the transparent portion of the side wall of the housing as the diaphragm moves between its reset position and its extended position;
   a vacuum pressure port opening to the first sub-chamber and being adapted to permit air communication between the air flowing in the HVAC system and the first sub-chamber;
   a positive pressure port opening to the second sub-chamber, wherein the filter indicating device is adapted for connection to measure differential pressure drop across a micron filter by connecting the positive pressure port to the HVAC duct at a location upstream from the micronfilter and by connecting the vacuum pressure port to the HVAC duct at a location downstream from the micronfilter; and a compression spring disposed in the first sub-chamber of the housing, with one end of the compression spring being in contact with the first end of the housing and the other end of the compression spring being in contact with the indicating member, with the compression spring normally biasing the diaphragm and the indicating member toward the reset position and having a compression force sufficient to balance the differential pressures between the first and second sub-chambers that are experienced while the indicating device is measuring the very low ranges of filter restriction normally found in the HVAC system so that the diaphragm will be positioned in its reset position when the air flow through the HVAC system filter is unrestricted, due to entrapped dirt and the like, and so that the diaphragm, and the indicating member, will be moved from the reset position progressively toward the extended position in response to increases in the restriction of air flow through the HVAC system filter.

25. The improved air filter indicating device of claim 24, wherein the device has a generally linear response rate over its operating range.

\* \* \* \* \*